(12) United States Patent
Park

(10) Patent No.: US 7,690,270 B1
(45) Date of Patent: Apr. 6, 2010

(54) LOAD MEASURING TRANSDUCER USING INDUCED VOLTAGE FOR OVERCOMING ECCENTRIC ERRORS AND LOAD MEASURING SYSTEM USING THE SAME

(76) Inventor: Heung Hoon Park, 501-802 Kumho Bestville, Sanghyeon-dong, Suji-gu, Yongin, Gyeonggi-Do (KR)

(*) Notice: Subject to any disclaimer, the term of this patent is extended or adjusted under 35 U.S.C. 154(b) by 0 days.

(21) Appl. No.: 12/505,427

(22) Filed: Jul. 17, 2009

(30) Foreign Application Priority Data

Jun. 16, 2009 (KR) .................. 10-2009-0053596

(51) Int. Cl.
*G01L 1/22* (2006.01)

(52) U.S. Cl. .................. 73/862.045; 73/862.61; 73/862.69; 73/862.623

(58) Field of Classification Search .................. 73/862.041–862.046, 862.76–862.86
See application file for complete search history.

(56) References Cited

U.S. PATENT DOCUMENTS

| | | | |
|---|---|---|---|
| 3,202,948 | A | 8/1965 | Farrand |
| 3,827,291 | A | 8/1974 | McCalvey |
| 4,521,685 | A | 6/1985 | Rebman |
| 4,572,006 | A | 2/1986 | Wolfendale |
| 4,649,759 | A | 3/1987 | Lee |
| 5,129,262 | A | 7/1992 | White et al. |
| 5,492,020 | A | 2/1996 | Okada |
| 5,497,668 | A | 3/1996 | Okada |
| 6,705,166 | B2 | 3/2004 | Leonardson |
| 7,258,028 | B2 * | 8/2007 | Park .................. 73/862.625 |
| 7,603,919 | B2 * | 10/2009 | Morimoto .................. 73/862.68 |

FOREIGN PATENT DOCUMENTS

| | | |
|---|---|---|
| JP | 60-147616 A | 8/1985 |
| JP | 63-042436 A | 2/1988 |
| JP | 02-278119 A | 11/1990 |
| JP | 3046959 A | 2/1991 |
| JP | 04021831 A | 1/1992 |
| JP | 04-039551 A | 2/1992 |
| JP | 04-141907 A | 5/1992 |
| JP | 06-147958 A | 5/1994 |
| JP | 06-174535 A | 6/1994 |
| JP | 07-094962 A | 4/1995 |
| JP | 07-113587 A | 5/1995 |
| JP | 07-139991 A | 6/1995 |
| JP | 08-320124 A | 12/1996 |
| JP | 10-227685 A | 8/1998 |
| JP | 11-223507 A | 8/1999 |
| JP | 2001-074405 A | 3/2001 |
| JP | 2001-255216 A | 9/2001 |
| JP | 2002-228516 A | 8/2002 |
| KR | 20050026167 A | 3/2005 |
| KR | 20050066577 A | 6/2005 |

* cited by examiner

*Primary Examiner*—Max Noori
(74) *Attorney, Agent, or Firm*—Edwards Angell Palmer & Dodge LLP; Kongsik Kim

(57) ABSTRACT

Load-measuring transducers utilizing induced-voltage measurement techniques are described. The wiring patterns of such transducers can be configured with a plurality of moveable gauge portions to reduce errors encountered with eccentricities between the transducer gauges, and are preferably configured to reduce interference errors due to wiring patterns thereof.

5 Claims, 14 Drawing Sheets

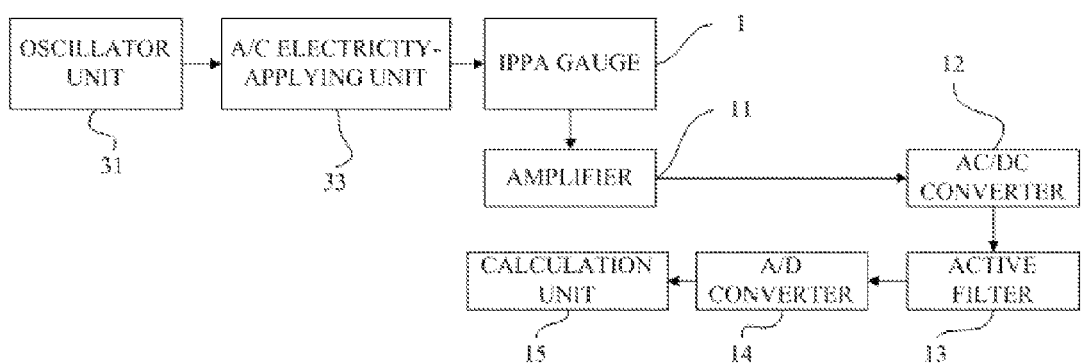
[FIG 1]

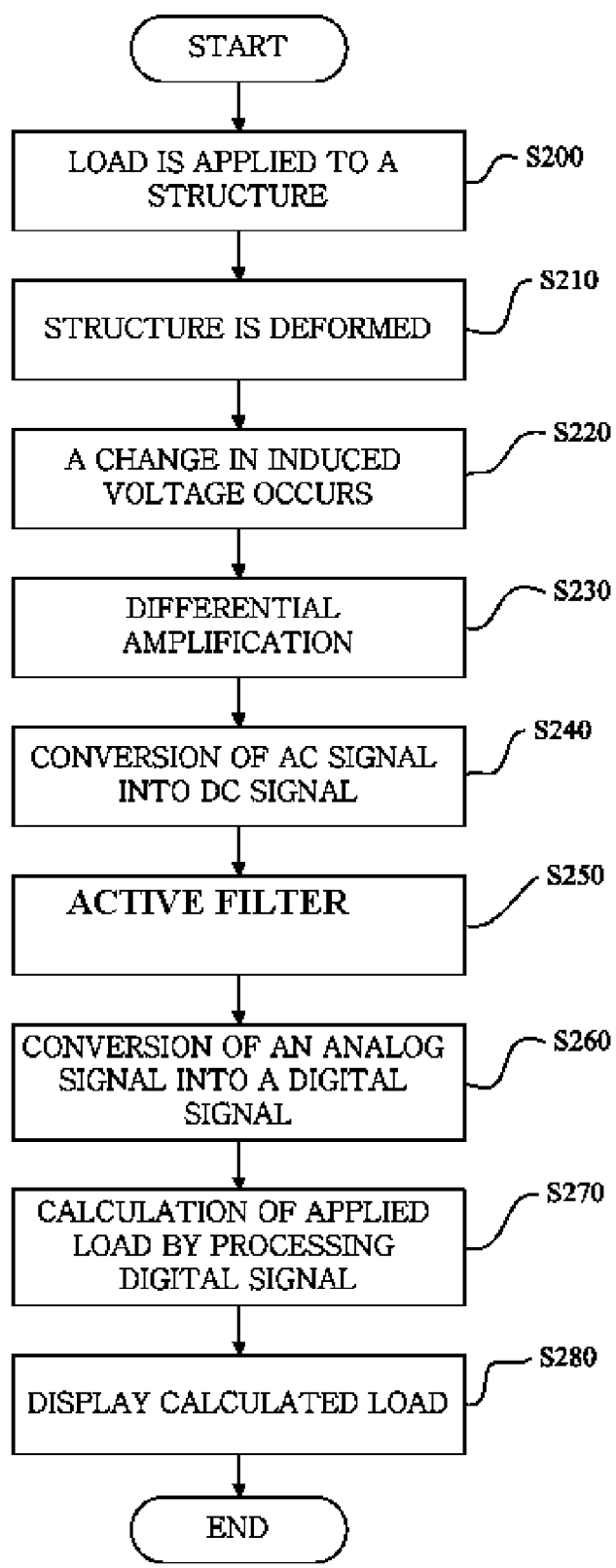

【FIG 3a】
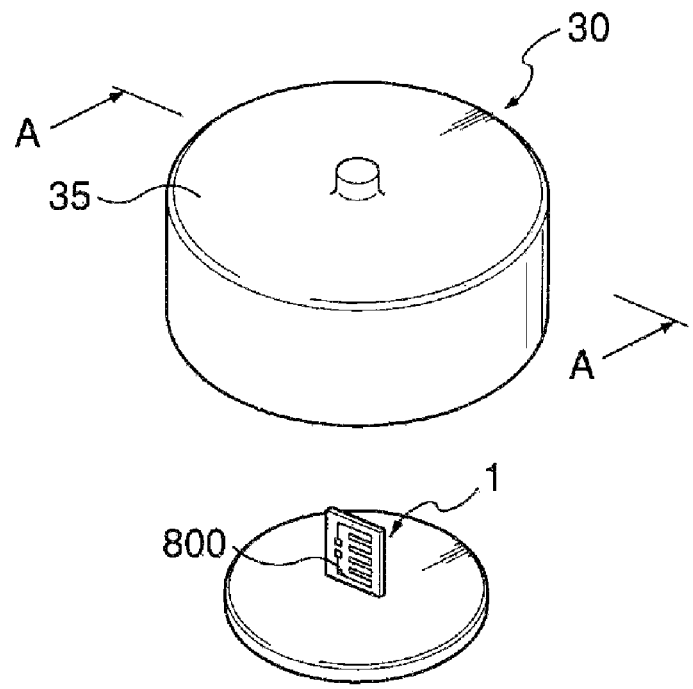
【FIG 3b】
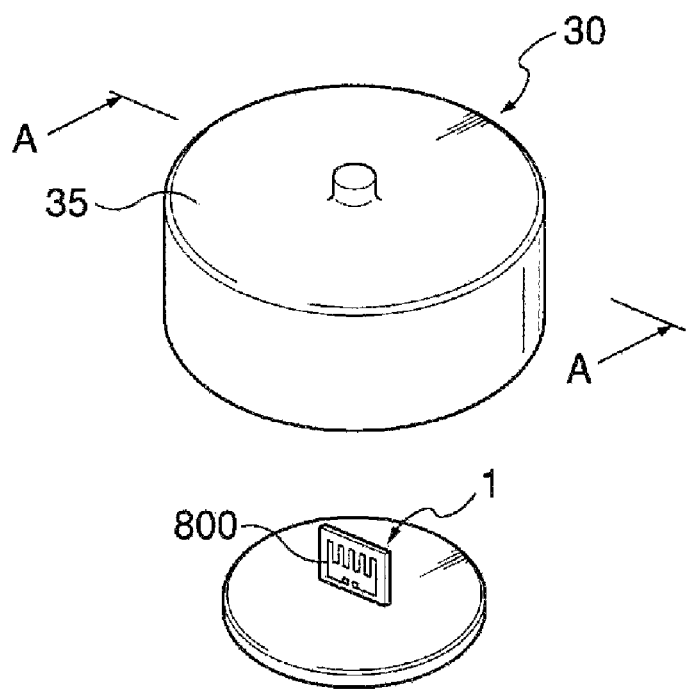

[FIG 4a]
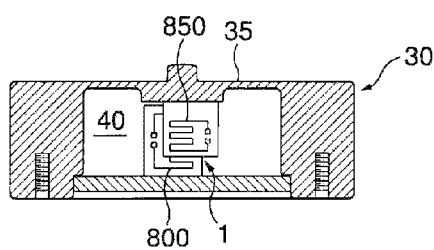
[FIG 4b]
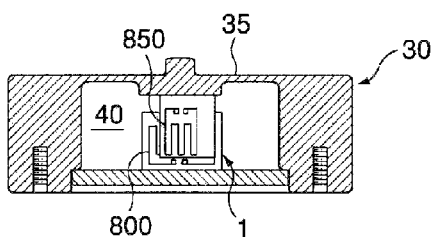
[FIG 5]
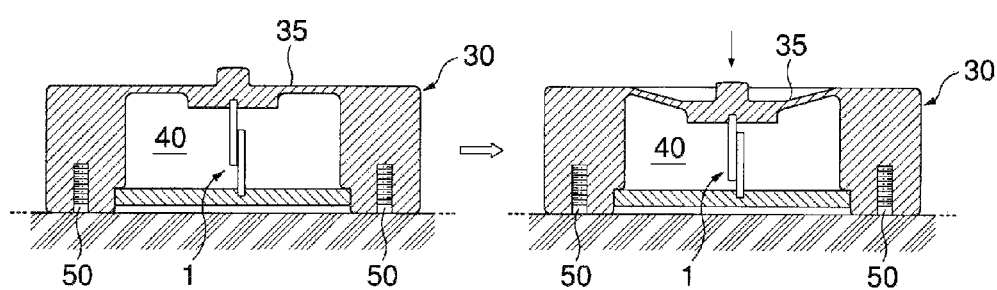

[FIG 6]
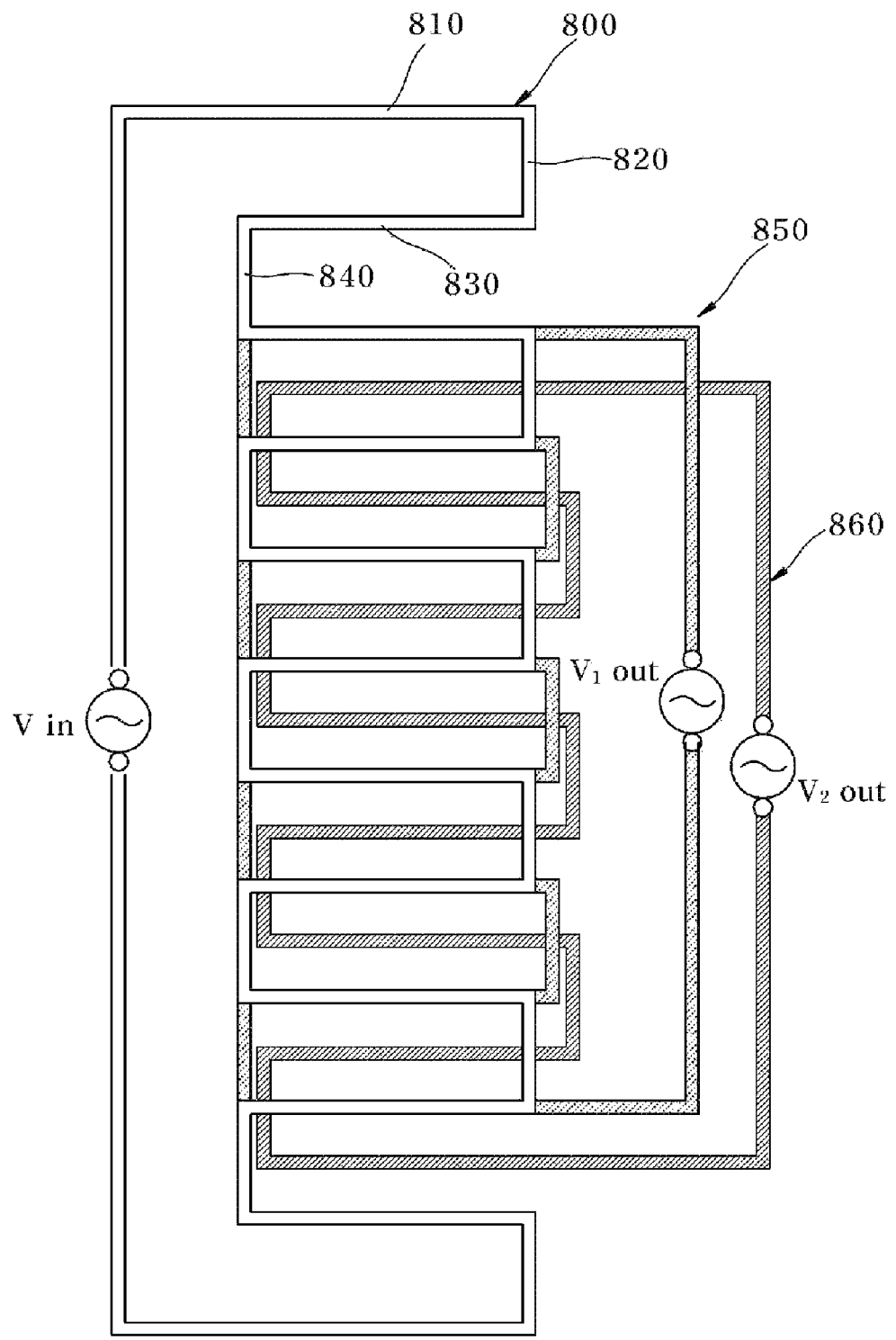

[FIG 7]
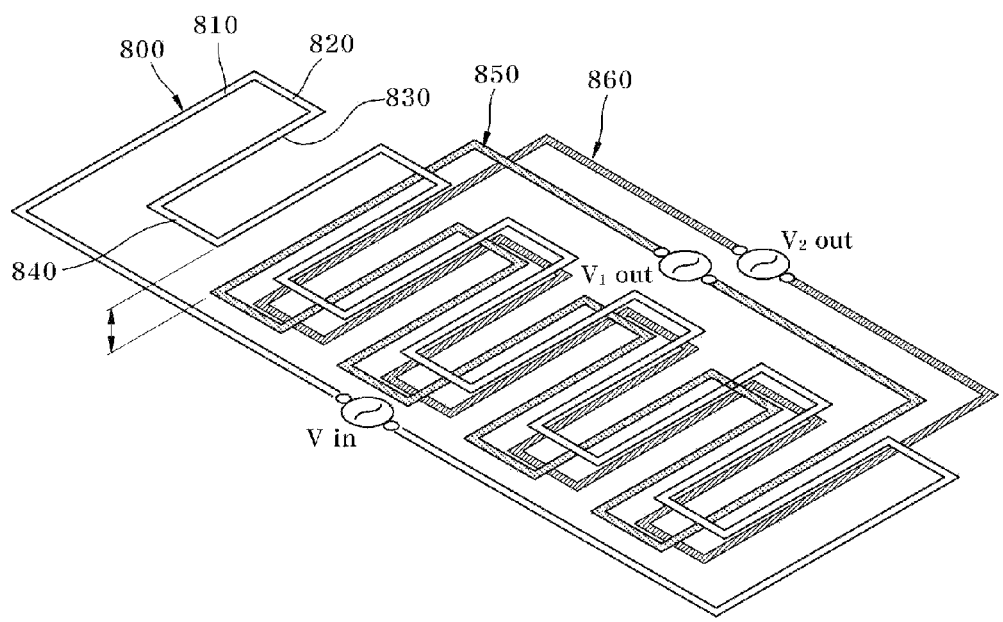

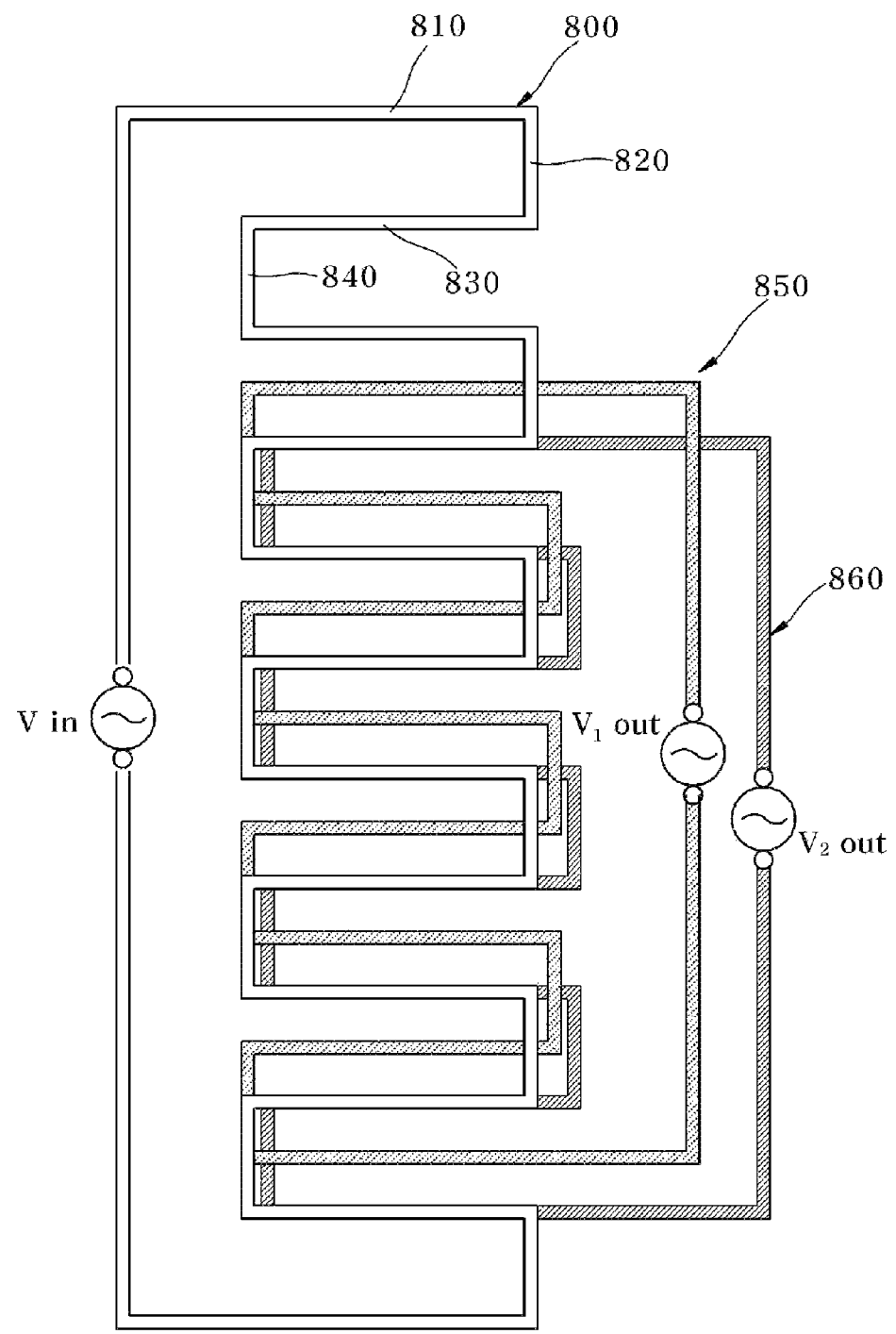

[FIG 9]
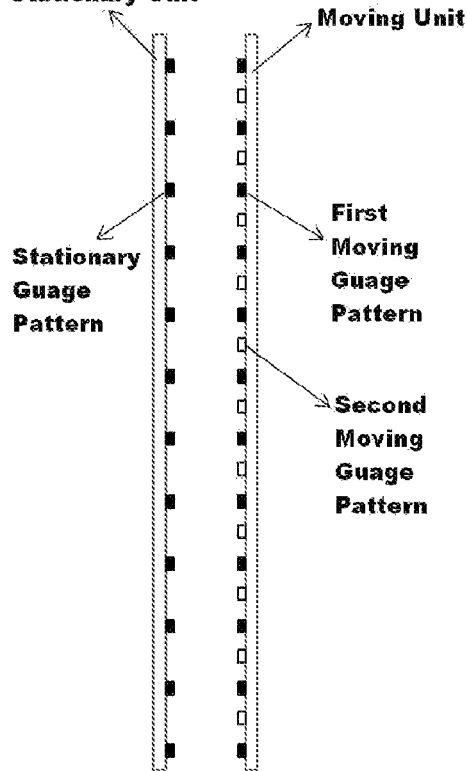
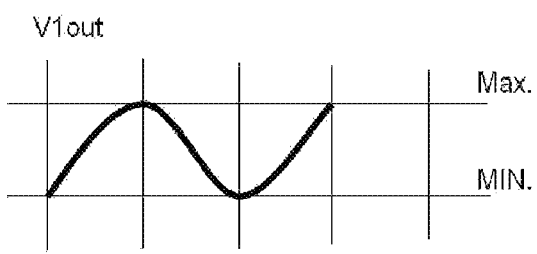
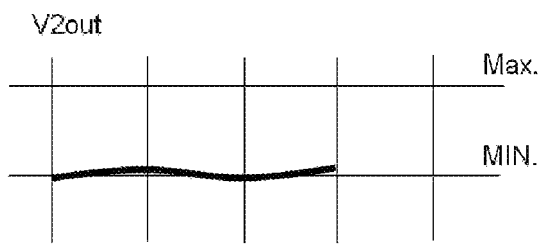

【FIG 10】
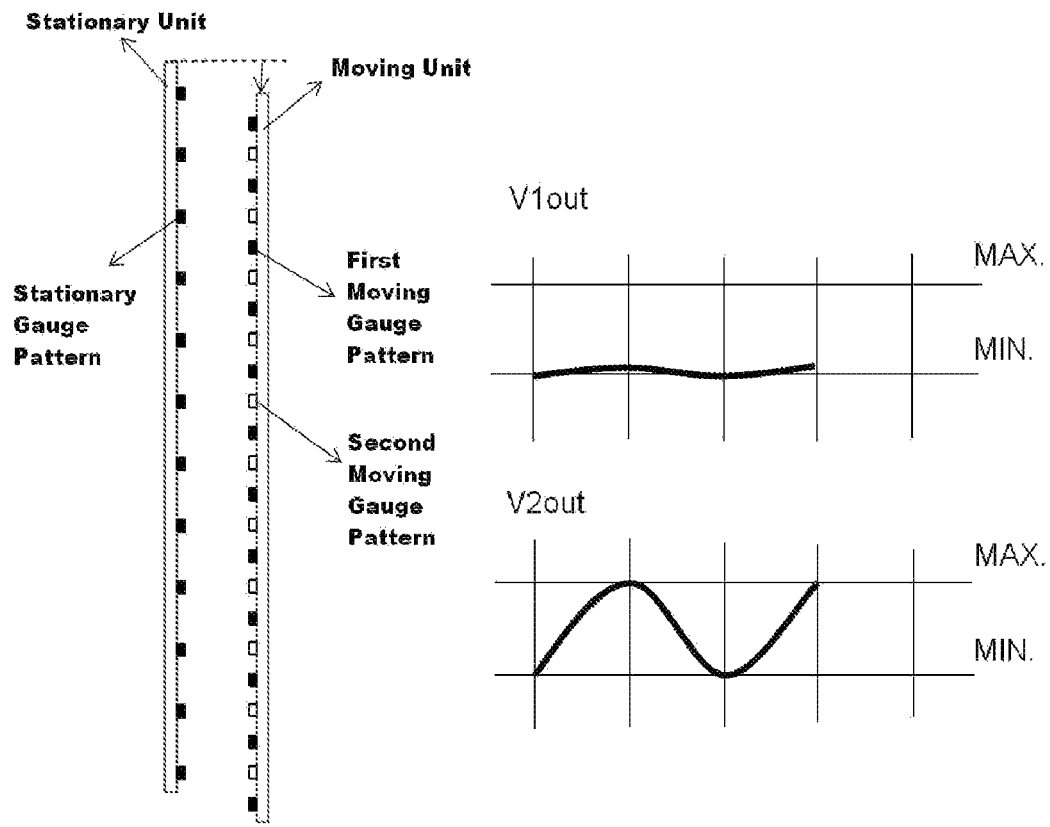
【FIG 11】
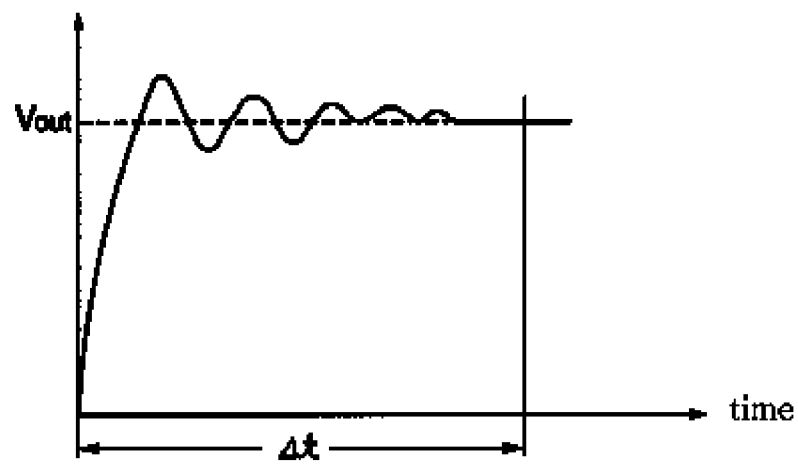

[FIG 12]
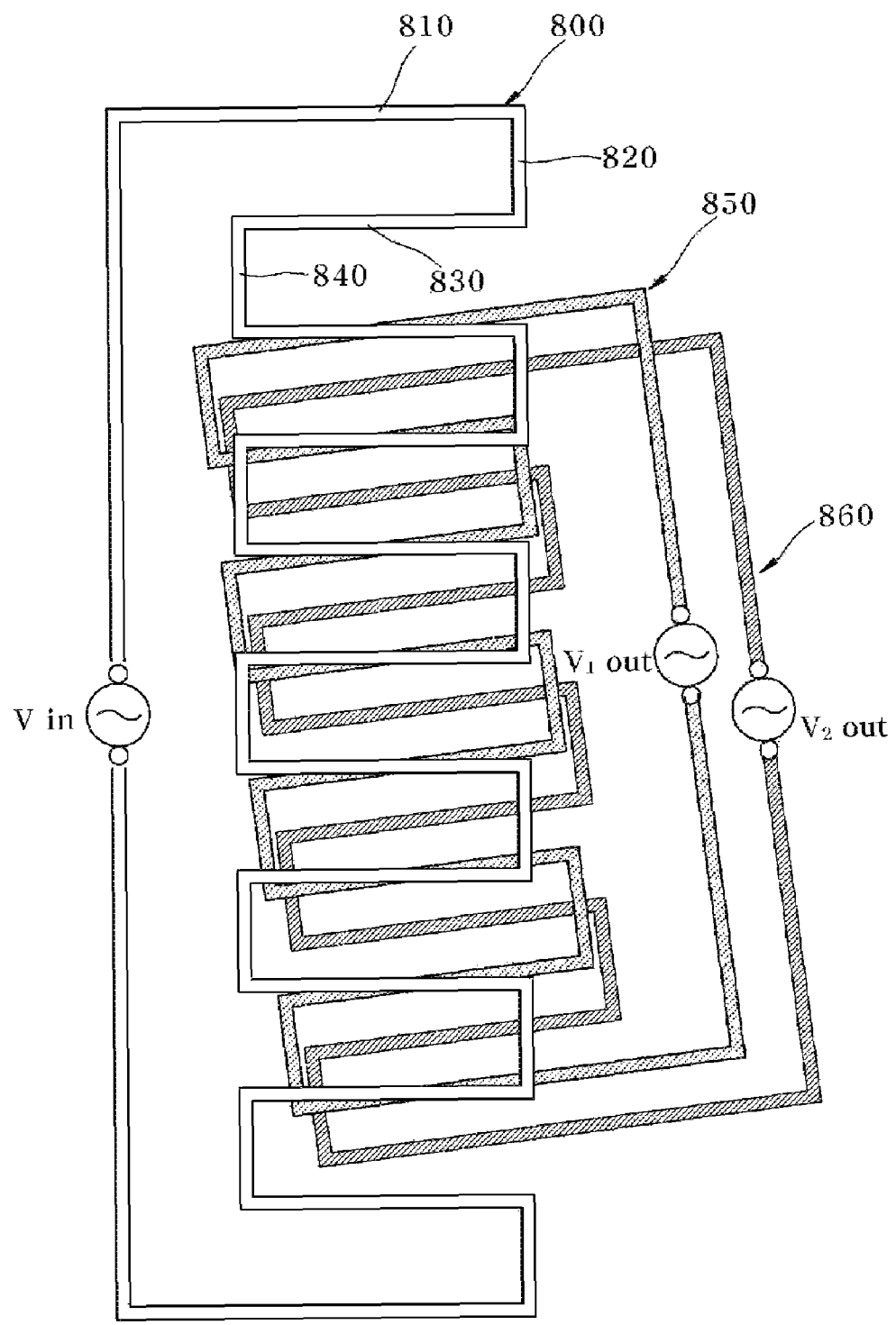

[FIG 13]
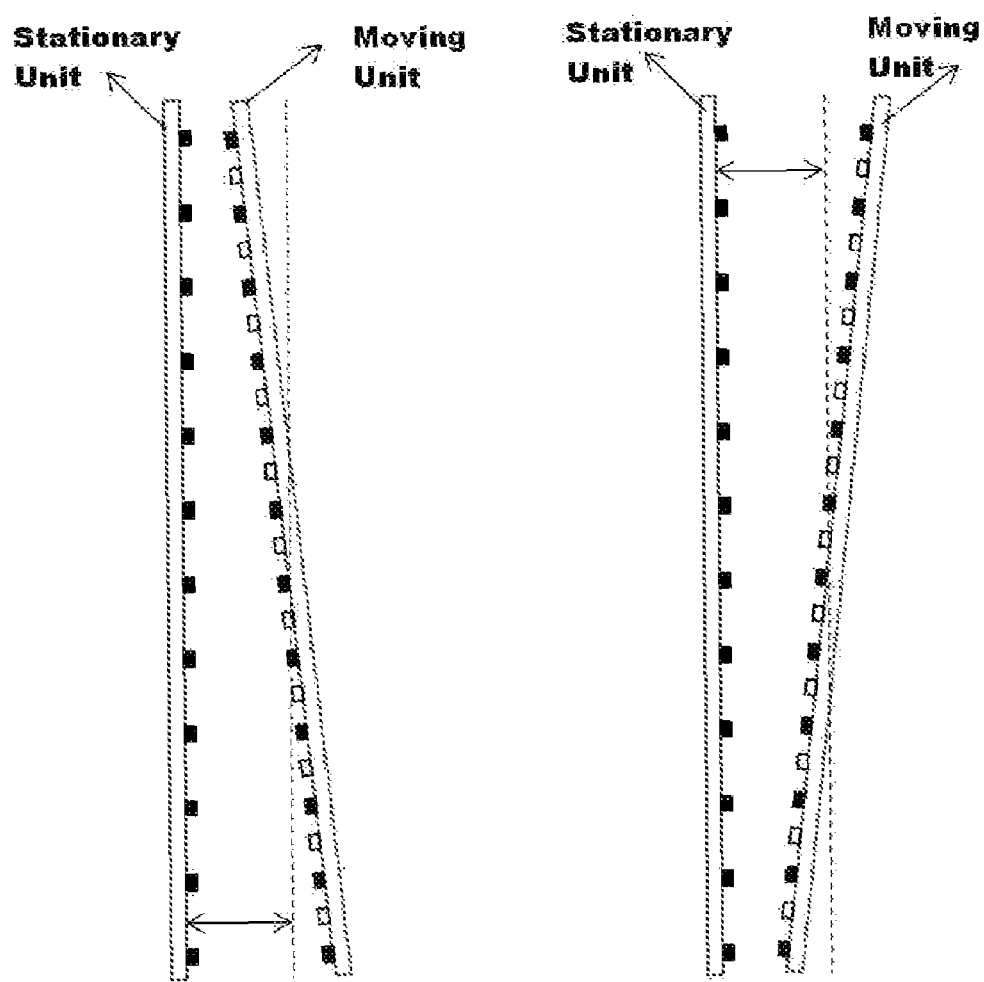

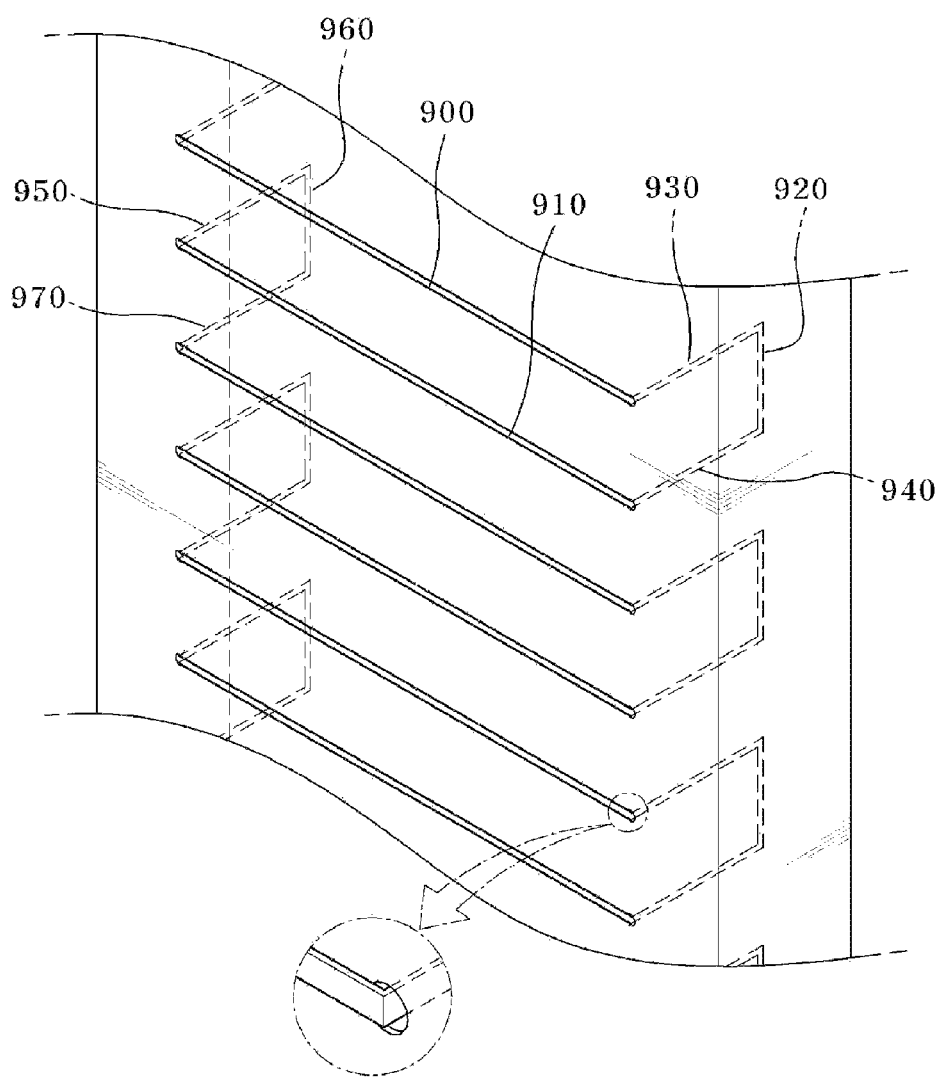
[FIG 14]

[FIG 15]
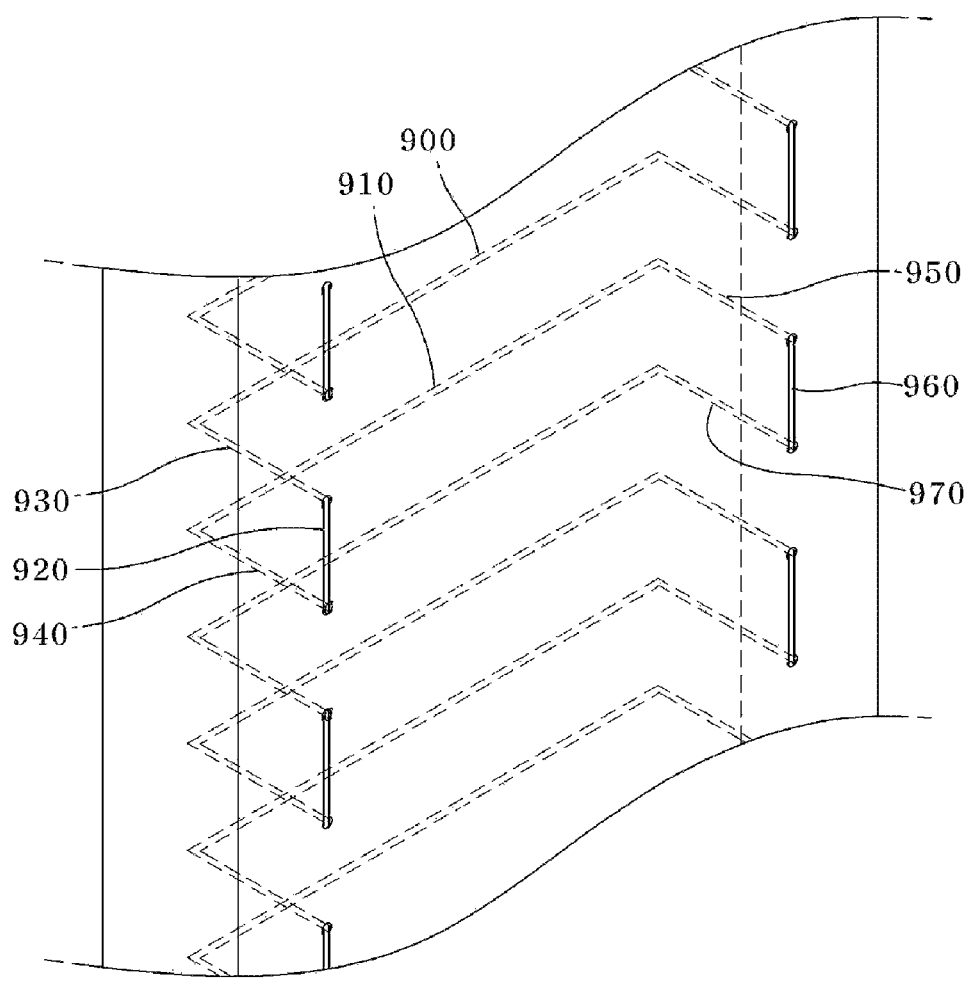

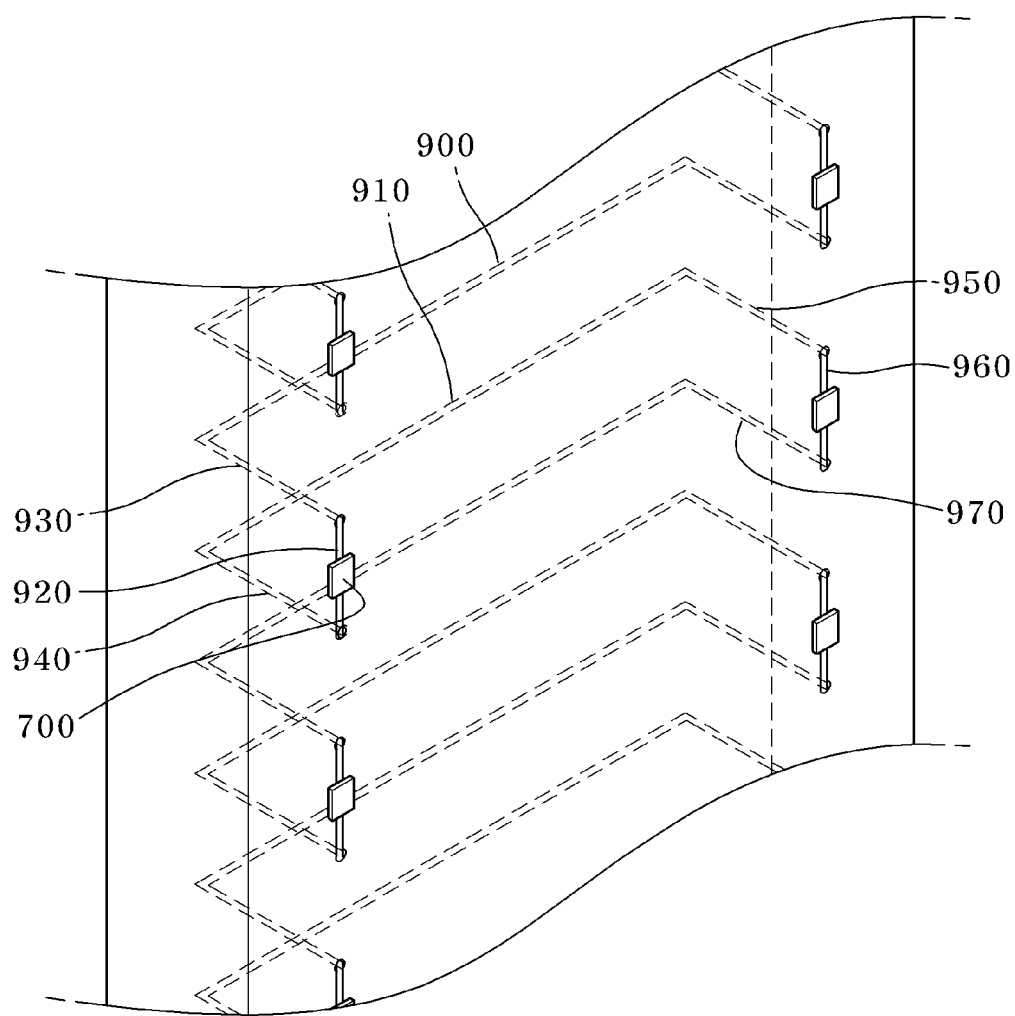
[FIG 16]

LOAD MEASURING TRANSDUCER USING INDUCED VOLTAGE FOR OVERCOMING ECCENTRIC ERRORS AND LOAD MEASURING SYSTEM USING THE SAME

CROSS-REFERENCE TO RELATED APPLICATIONS

This application claims the benefit of priority from Korean Patent Application No. 10-2009-0053596 filed on Jun. 16, 2009, which application is incorporated herein by reference in its entirety.

BACKGROUND OF THE INVENTION

1. Field of the Invention

The present invention relates to load measuring sensor gauges for measuring loads, as well as to load measuring systems using such sensor gauges. More particularly, the present invention relates to sensor gauges and systems, wherein load is applied to an elastically deformable structure to produce an elastic deformation in the structure. The applied load is then measured using an induced-voltage sensor gauge configured to detect an induced voltage corresponding to the produced elastic deformation.

2. Background of the Related Art

Typically, general-purpose electronic scales, industrial electronic scales and the like utilize so-called "electric resistance type load cells". Such load cells employ a strain gauge using resistive wire. In such load cells, when a strain is experienced by a structure due to application of load, the strain is detected as a change in electrical resistance of the resistive wire, and is then converted into an electrical signal that in-turn is measured, thereby enabling measurement of the applied load.

Currently, load cells with strain accuracy as high as between about 1/3,000 and 1/5,000 are generally available. It is very difficult to implement a load cell with accuracy higher than the above accuracy. This is because there are problems in that typically a layer of adhesive is used to attach a strain gauge to its supporting structure, and the adhesive can distort. Thus, strain produced in the structure is transferred, but extension and compression behavior of the structure is modified. Further, because the adhesive is made of polymer that has an inhomogeneous amorphous structure, the adhesive exhibits non-uniform mechanical properties that cannot be easily predicted.

Inherent features of typical strain gauges also adversely affect attaining higher accuracies. Particularly, a back plate which is typically made of a polymeric material such as phenol or polyamide, and which is placed below the resistive material of the strain gauge, inhibits the transfer of strain.

Further, because it is difficult to achieve a uniform profile of the resistive material throughout the strain gauge, it is also difficult to obtain uniform deformation thereof that is proportional to a compressive or tensile strain of a structure.

Another prior technique for measuring load uses an electromagnetic force balancing type load measuring transducer. However, since this load measuring transducer employs a very complicated mechanical mechanism, the load measuring transducer is difficult to manufacture and is very expensive. In addition, there are electrical and spatial limitations on increases of electromagnetic force, serving as balancing forces for applied loads. Further, since the complicated mechanical mechanism includes many thin hinges, there are problems in that it is not suitable for measurement of heavy loads and it is very vulnerable to external impacts.

Due to the above problems, such a load measuring transducer cannot easily be used in general-purpose commercial electronic scales or industrial electronic scales and only selectively used in special-purpose electronic scales.

To solve the above problems, related technologies are disclosed in Korean Patent Registration No. 10-0500736 and U.S. Pat. No. 7,258,028 B2.

In the prior art, when eccentricity is produced in a gauge due to applied load, measurement errors occur in the gauge. In order to prevent this problem, the patterns of a stationary coil and a moveable coil are formed on a concentric arc shape, thereby easily accommodating the eccentric phenomenon that occurs when a load is applied.

However, this method is not a fundamental solution for preventing errors caused by eccentricity. Accordingly, there is a need for a method of fundamentally solving the such eccentricity problems.

In the referenced prior art, two gauges, each having electric wire patterns repeatedly formed thereon, are arranged facing one another, and an Alternating Current (AC) voltage applied to one of the gauges induces an AC voltage in the other of the gauges, which is measured, which corresponds to the applied load. An example shape for such gauges is shown in FIG. 6.

However, the above-described prior art suffers from problems relating to the short, connecting wired, which are perpendicular to the longer wires, adversely influence the overall magnetic field, resulting in errors. This is because an induced voltage is determined by relative positions between long, parallel electric wires. In order to solve these problems, the amount of voltage generated by the short electric wires must be theoretically calculated and corrected.

SUMMARY OF THE INVENTION

Accordingly, the present invention has been made in view of the above problems with conventional load measuring sensors and systems. An object of the present invention is to provide load measuring sensor gauges and load measuring systems, which are capable of measuring loads with higher accuracies through more simplified structures and components.

Another object of the present invention is to fundamentally solve problems resulting from eccentricity using two moveable gauges which are displaced from one another by ¼ pitch of the wiring patterns of the gauges.

Yet another object of the present invention is to provide convenience without need for additional error correction processes, and also to increase measurement accuracy by essentially structurally removing error-producing portions from electric wire patterns.

A load measuring transducer according to an embodiment of the present invention for measuring load applied to a structure, the structure including a deformation-producing portion configured to exhibit elastic deformation when the load is applied to the structure comprises a stationary gauge having electric wire patterns with a predetermined pitch, the wire pattern repeating a predetermined number of times, and configured and adapted to receive application of AC electricity; a stationary unit having the stationary gauge formed therein; first and second moveable gauges configured to move in a longitudinal direction of the stationary gauge without coming into contact with the stationary gauge in response to elastic deformation produced in the deformation-producing portion, the first and second moveable gauges each having electric wire patterns formed thereon with the same pitch as the stationary gauge, the wire pattern repeating a predetermined number of times; and a moveable unit having the first and second moveable gauges formed therein. Each of the electric wire patterns of the stationary gauge, the first moveable gauge, and the second moveable gauge comprises a first portion 810 extending in a straight line, a second portion 820 extending in a direction perpendicular to the first portion, a third portion 830 extending in parallel to the first portion 810 in a direction perpendicular to the second portion 820, and a pattern-connecting portion 840 extending in a direction perpendicular to the third portion. The first moveable gauge is formed in the moveable unit such that the first portion 810 of the electric wire patterns of the first moveable gauge overlaps with the first portion of the electric wire patterns of the stationary gauge, and the second moveable gauge is formed in the moveable unit such that the first portion 810 of the electric wire patterns of the second moveable gauge is displaced by ¼ pitch from the first portion of the electric wire patterns of the stationary gauge.

The applied load can be measured based on a ratio of a voltage measured from the first moveable gauge and an induced voltage measured from the second moveable gauge.

The first moveable gauge and the second moveable gauge can be formed in different moveable units.

The moveable gauge can be movable within a range of ¼ of a pattern pitch of the stationary gauge.

A load measuring system according to an embodiment of the present invention for measuring load applied to a structure including a deformation-producing portion configured to exhibit elastic deformation when the load is applied to the structure comprises such a load measuring transducer and a calculation unit calculating a magnitude of the applied load based on a ratio of induced voltages output from the first and second moveable gauges of the transducer.

BRIEF DESCRIPTION OF THE DRAWINGS

The above and other objects and features of the present invention will become apparent from the following description of preferred embodiments, given in conjunction with the accompanying drawings, in which:

FIG. 1 is a block diagram of a load measuring system applicable to transducers according to the present invention;

FIG. 2 is a flowchart illustrating a load measuring method applicable to transducers according to the present invention;

FIGS. 3a and 3b are exploded perspective views of load measuring transducers and housings, suitable for use with sensor gauges according to the present invention;

FIGS. 4a and 4b are sectional views of a transducers and housings, suitable for use with the subject sensor gauges, according to another embodiment of the present invention;

FIG. 5 is a sectional view of a structure to which the load-measuring transducer using the gauges shown in FIG. 3 is employed;

FIG. 6 is a conceptual plan view showing an example schematic representation of the gauges according to the present invention;

FIG. 7 is a conceptual perspective view showing an example schematic representation of the gauges according to the present invention;

FIG. 8 is a conceptual plan view schematic, wherein a moveable gauge is moved by ¼ pitch from the positioning shown in FIG. 7;

FIG. 9 includes a schematic side view and graphs conceptually showing changes in an output voltage according to a relative positions between the gauges;

FIG. 10 includes a schematic side view and graphs conceptually showing changes in an output voltage according to a relative position between the gauges, when a moveable gauge is moved by ¼ pitch from the positioning shown in FIG. 12;

FIG. 11 is a graph conceptually showing changes in an output induced voltage, upon application of a load, when the load measuring transducer of the present invention is operated;

FIG. 12 is a conceptual plan view illustrating a moveable gauge eccentrically moved in the plane of the gauge;

FIG. 13 is a conceptual plan view when the moveable gauge is eccentrically moved out of the plane of the gauge;

FIG. 14 is a partial perspective view showing the first surface of a member to which a gauge is provided, according to another embodiment of the present invention;

FIG. 15 is a partial perspective view showing the second surface of the member of FIG. 14, to which the gauge is provided according to the present invention; and FIG. 16 is a partial perspective view showing the second surface of a member to which a gauge is provided according to yet another embodiment of the present invention, wherein circuit elements are provided on the gauge.

DETAILED DESCRIPTION

Hereinafter, select embodiments of the present invention will be described in detail with reference to the accompanying drawings.

FIG. 1 shows an example of a system for measuring load using a load measuring sensor gauges according to the present invention. As shown in FIG. 1, the load measuring system of the present invention comprises an oscillator unit 31, an AC electricity-applying unit 33, an IPPA gauge 1, an amplifier 11, an AC/DC converter 12, an active filter 13, an A/D converter 14, a calculation unit 15 and a display (not shown). The term "IPPA gauge" used herein is an acronym for "Inductance Pattern Analogue Gauge". In such gauges, AC is applied to one side (e.g. a stationary side) of the gauge. A voltage is induced in the other side of the gauged (e.g. the moveable gauge), which varies with such movement. The induced voltage is continuously measured, thereby measuring applied load in real time.

Alternatively, the induced voltage can be measured after a lapse of a predetermined period of time in order to measure applied load independently.

The oscillator unit 31 includes a high frequency oscillation circuit, and an AC signal generated by the oscillation unit 31 is applied to the AC electricity-applying unit 33 that in-turn amplifies the AC signal to have a predetermined level of voltage. The AC electricity-applying unit 33 applies the amplified AC signal to the IPPA gauge 1. The IPPA gauge 1 comprises a stationary gauge 800 and a moveable gauge 850 that can move without contact with respect to the stationary gauge 800. The detailed structure of the IPPA gauge 1 will be described with reference to FIG. 6.

The IPPA gauge 1, as shown in FIG. 6, includes a stationary gauge 800, and first and second moveable gauges 850 and 860, movably arranged with respect to the stationary gauge 800 without coming into contact with the stationary gauge 800. In practice, the stationary gauge 800 and the first and second moveable gauges 850 and 860 are formed in a stationary unit and a moveable unit, respectively. The stationary unit and the moveable unit are not shown in FIG. 6, for convenience of description. Preferably, the stationary unit and the moveable unit are formed on respective flat plates. Furthermore, the first moveable gauge 850 and the second moveable gauge 860 may be provided on a single moveable unit or different moveable units. Preferably, the distance between the stationary gauge 800 and the first moveable gauge 850 is identical to the distance between the stationary gauge 800 and the second moveable gauge 860.

Each of the stationary gauge 800 and the first and second moveable gauges 850 and 860 is formed with repeating wire patterns. Each pattern comprises a first portion 810 extending in a straight line, a second portion 820 extending laterally (perpendicular) from an end of the first portion 810, and a third portion 830 extending laterally (perpendicular) from an end of the second portion 820, but extending in parallel to the first portion 810. The patterns are then repeated. Each of pattern-connecting portions 840 extends from the third portion 830 in a direction perpendicular to the third portion 830 and connects subsequent patterns. Each of the stationary and moveable gauges has a pitch P between adjacent patterns. Preferably, their pitches are substantially the same as one another.

The principle of operation of the load measuring transducer according to the present invention is as follows. The first moveable gauge 850 and the second moveable gauge 860, together, are fixed to a moveable unit. Although the two moveable gauges are carried by the moveable unit, they are described as one moveable gauge, for convenience of description.

When an elastic deformation is produced in a structure, the moveable gauge elements 850, 860 of the IPPA gauge 1 are moved in the direction of deformation. When the moveable gauge elements 850, 860 are moved with respect to the stationary gauge 800 in such a manner, induced voltage is generated between the ends of the moveable gauge 850, 860 and the generated voltage signal is applied to and amplified by an amplifier 11. The amplifier 11 is chiefly an operational amplifier that preferably performs differential amplification.

Meanwhile, according to the present invention, the moveable gauge 850, 860 may be moved in a direction perpendicular to the longitudinal direction of the gauges. According to the present invention, even though the moveable gauge 850, 860 is moved in a direction perpendicular to the longitudinal direction of the gauges, there is an advantage in that load can still be measured without meaningful limitation on the lateral movement of the moveable gauge 850, 860.

FIG. 4a is sectional view showing a case where the IPPA gauge 1 according to an embodiment in which the moveable gauge 850 is moved in a longitudinal direction of the gauge as shown in FIG. 10, and is mounted in the structure 30. FIG. 4b is a sectional view showing a state the IPPA gauge 1 according to another embodiment in which the moveable gauge 850 is moved in a direction perpendicular to the longitudinal direction in the gauge as shown in FIG. 12, and is mounted in the structure. In the above two embodiments, the moveable gauge 850 is moved depending on deformation of a deformation-producing portion 35, which is produced when load is applied to the structure 30. Then, a value of induced voltage generated in the moveable gauge is measured. Thus, the applied load can be measured.

Hereinafter, a method of measuring applied load by measuring the magnitude of induced voltage generated in the moveable gauges 850 and 860 is described in more detail.

FIGS. 9 and 10 show changes in an output induced voltage value according to a relative position between a stationary unit and a moveable unit. The figures include cut-away diagrams of a central portion of the stationary unit and the moveable unit, wherein vertical portions of the electric wire patterns are not shown.

Initially, the horizontal electric wires of the stationary gauge 800 and the horizontal electric wires of the first moveable gauge 850 overlap one another. As illustrated in FIG. 10, then the horizontal electric wires of the second moveable gauge 860 are displaced by ¼ pitch from the horizontal electric wires of the stationary gauge 800 and the first moveable gauge 850. In this case, an induced voltage, $V_1$out, having the same cycle as an AC applied to the stationary gauge 800, and having an AC waveform with a maximum amplitude, is output to the first moveable gauge 850. An induced voltage, $V_2$out, is minimally output to the second moveable gauge 860 because of the interference between the first portion and the third portion of the electric wire patterns of the stationary gauge 800. The induced voltage $V_2$out, which is lower in amplitude than the induced voltage $V_1$out, is output. In practice, the induced voltage $V_2$out has an AC waveform with the same cycle as the induced voltage $V_1$out.

As the moveable unit is moved by an applied load, the electric wire patterns of the gauges deviate from one another. When the moveable unit is moved by ¼ pitch of the patterns, the induced voltage $V_2$out exhibits an AC waveform having a maximum amplitude, and the induced voltage $V_1$out, in-turn, exhibits an AC waveform smaller than that of the induced voltage $V_2$out.

The ratio of $V_1$out and $V_2$out has a constant value according to a relative position between the moveable unit and the stationary unit, depending on applied load. This corresponds to the same principle as a tangent value being constant if the angle is constant although the size changes from a right triangle to a triangle.

In cases where load is calculated by measuring an absolute value of an induced voltage using only one moveable gauge, the absolute value of the induced voltage is changed according to the distance between the moveable gauge and the stationary gauge. In this case, if eccentricity occurs between the moveable gauge and the stationary gauge, the distance between the two gauges is changed. Thus, the magnitude of the induced voltage is increased or decreased, and so errors are generated by the eccentricity.

FIG. 12 shows a case where the gauges have been eccentrically moved in their plane, viewed in the plan direction, and FIG. 13 shows a case where the gauges have been eccentrically moved out of their planes. If only one moveable gauge is used, errors resulting from the eccentricity are very great. However, in the case where two moveable gauges are used, as in the present invention, where the moveable gauges are mutually displaced by ¼ pitch from one another, if the moveable unit is moved by a predetermined distance, the ratio of $V_1$out and $V_2$out is not changed as long as the ratio of changes in the amplitudes of $V_1$out and $V_2$out resulting from the eccentricity is constant. However, the amplitudes of $V_1$out and $V_2$out may change when the eccentricity occurs, versus when the eccentricity does not occur.

According to the embodiment of the present invention, in order to remove errors resulting from eccentricity, both the first moveable gauge and the second moveable gauge, displaced by ¼ pitch with respect to the first moveable gauge, are used. Furthermore, the present invention is based on the fact that the ratio of $V_1$out and $V_2$out is not changed even by an eccentricity.

It should be noted that the embodiment of the present invention fundamentally differs from a technology in which, after two moveable gauges are connected in series, a relative distance between gauges is calculated by measuring the difference between voltages induced in the two moveable gauges according to changes in a relative position with the stationary gauge.

FIG. 11 shows a graph of the output voltage induced in the moveable gauge 850 versus time in a general case, where load is applied to the structure. As shown in the graph of FIG. 11, the magnitude of the voltage induced at the moveable gauge 850 slightly fluctuates and then converges to a certain value. To measure the converged voltage value, it is preferred to measure a voltage Vout after a lapse of a predetermined period of time Δt (delta t).

The electric signal that is induced at the IPPA gauge 1 and then amplified by the amplifier 11 is an AC signal. The AC signal is preferably used directly. However, an AC/DC converter 12 may be further provided as means for converting the AC signal into a DC signal, if appropriate. The electric signal converted into the DC signal passes through an active filter 13 so that electrical noise or surge signals can be removed and filtered out and an effective optimal signal is thus obtained.

The electrical signal provided through the amplifier 11 is then converted into a digital signal by the A/D converter 14. The obtained digital signal is finally input into a calculation unit 15 that in turn calculates the magnitude of load applied to a structure 30 from the digital signal based on the voltage signal induced at the moveable gauge 850.

It is preferred that the calculation unit 15 be implemented with a microprocessor. The calculated magnitude of load can be displayed on a display device. In addition, conventional input means may be used to input configuration values, setup information, and factors, communication messages, timer parameters or the like into the microprocessor.

FIG. 2 is a flowchart illustrating a load measuring method according to an embodiment of the present invention. In FIG. 2, although two moveable units may be used, only moveable unit and one moveable gauge are shown and described, for convenience of description. It is, however, to be noted that two moveable gauges are preferably used in the present invention.

When load is applied to a structure (step S200), the structure is then deformed (step S210). The displacement of the moveable gauge 850 in the IPPA gauge 1 occurs depending on the amount of deformation of the structure. This causes a change in an induced voltage at the moveable gauge 850 due to its relationship with the stationary gauge 800 (step S220).

AC electricity generated by the oscillator unit 31 is applied to the stationary gauge 800 of the IPPA gauge 1 by the AC electricity-applying unit 33. Upon elastic deformation in the structure, the moveable gauge 850 is displaced with respect to the stationary gauge 800 without contact, resulting in a change in the induced voltage due to an electromagnetic induction phenomenon.

The obtained value of the change in the induced voltage is differentially amplified by the amplifier 11 (step S230). Thereafter, the conversion of an AC signal into a DC signal is performed, if necessary (step S240). Then, any electric noises and any surge signals are filtered out (step S250), the conversion of an analogue signal into a digital signal is performed (step S260), and the digital signal is processed to accurately calculate the applied load by the calculation unit, i.e. microprocessor 15 (step S270). The processed signal, i.e. load, is displayed on the display (step S280).

The microprocessor 15 performs signal processing and calculation, and compensation operations such as key input, storage of setup information and factors, communications and input of time. The communications may be made by properly configuring a unidirectional or bidirectional communication scheme.

FIGS. 3a to 5 show the most basic embodiments in which the structure 30, a cylindrical member, is formed with a hollow portion 40 therein, wherein an upper part of the structure 30 comprises the deformation-producing portion 35 including a central axis (vertical axis).

It is preferred that the structure 30 includes a projection at the center of the deformation-producing portion 35 so that load can be applied directly to the projection. The deformation-producing portion 35 is a portion that is deformed to produce deformation in proportion to load applied thereto. The amount of deformation of the deformation-producing portion 35 is transferred to the moveable gauge 850 of the IPPA gauge. The movement of the moveable gauge 850 generates an induced voltage to be output. The induced voltage is processed through the aforementioned procedure and thus the applied load is obtained.

The structure 30 may have a detachable bottom portion 45. When the bottom portion 45 of the structure 30 is constructed as such, a hollow portion 40 can be isolated from the outside.

The deformation-producing portion 35 is a thin elastic body which is preferably constructed such that a central portion thereof protrudes with respect to a peripheral portion thereof to facilitate the occurrence of the deformation due to the applied load.

The IPPA gauge 1 converts the amount of deformation, which is produced due to the elastic deformation of the structure, into the amount of change in the induced voltage corresponding thereto and then outputs the amount of change. The moveable gauge 850 is mounted on the bottom surface of the deformation-producing portion 35 of the structure 30, and the stationary gauge 800 is placed to face the moveable gauge 850 and fixed to the bottom portion 45.

If the moveable gauge 850 mounted on the bottom surface of deformation-producing portion 35 of the structure 30 is moved downward due to the deformation of the deformation-producing portion 35, induction effects between the moveable gauge and the stationary gauge 800 to which the AC electricity is applied result in a changed induced voltage Vout at the moveable gauge 850.

Here, the moveable gauge 850 of the IPPA gauge 1 is connected to a circuit including the amplifier 11 and the like, and the output induced voltage Vout signal is processed through the aforementioned procedure. Therefore, the applied load is calculated based on the processing and then displayed.

According to the present invention, the load applied to the deformation-producing portion 35 can be transferred, without any distortion of the load, directly to the IPPA gauge 1 as a conversion means. Further, because the output induced voltage can be increased by increasing an AC frequency of the oscillator unit 31, it is possible to remarkably enhance load measurement accuracy as compared with conventional load cells.

To this end, it is preferred that among the two flat plates constituting the IPPA gauge 1, the upper flat plate formed with the moveable gauge 850 be arranged to be aligned with the central axis of the deformation-producing portion 35 of the structure and the other lower flat plate formed with the stationary gauge 800 be arranged in parallel to the upper flat plate.

In such a configuration, vertical load (designated by an arrow in the figures) applied to the center of the deformation-producing portion 35 can be accurately transferred directly to the IPPA gauge 1. Thus, based on the transferred deformation, the IPPA gauge 1 can obtain an accurate induced voltage corresponding to the amount of elastic deformation of the structure 30 due to the load applied thereto, i.e. the amount of deformation of the deformation-producing portion 35. Particularly, according to the present invention, it is possible to essentially prevent distortion phenomena from occurring when the deformation, and resultant deformation of the deformation-producing portion 35 occur. Therefore, the problems in the prior art are avoided.

Further, one advantage of the present invention is to provide simply constructed mechanisms for load detection. Thus, the present invention is more advantageous than the prior art in view of accuracy, as well as costs and simplicity of fabrication. Moreover, since the present invention easily overcomes vulnerability to heavier load or impact, the present invention can be widely used as simple scales and reliable load measuring systems in a variety of outdoor industrial sites.

Furthermore, as another embodiment of the present invention, the following gauge patterns may be taken into consideration. In other words, accurate results can be obtained in measuring load when considering only voltages induced by a mutual movement of the first portion 810 and the third portion 830 (i.e., the horizontal portions of the stationary gauge 800 and the moveable gauge 850). In the process of forming the above-described electric wire patterns, the second portion 820 and other short portions for connecting the first portion 810 and the third portion 830, are necessary for electrical continuity. As set forth above, however, these portions cause change in a magnetic field for the horizontal portions, thereby hindering accurate load measurement. Alternative gauge patterns in accordance with the invention for overcoming the above-described problem are illustrated in detail in FIGS. 14 to 16.

As illustrated in FIG. 14, a stationary gauge portion is formed having repeated patterns. Each of the patterns of the stationary gauge portion comprises a first portion 900, a second portion 930, a third portion 920, a fourth portion 940, a fifth portion 910, a sixth portion 950, a seventh portion 960, an eighth portion 970, and so on. The first portion 900 extends in a straight line on a first surface of a stationary unit. The second portion 930 extends from the first portion 900 and penetrates the stationary unit. The third portion 920 extends from the second portion 930 along the second surface of the stationary unit, in a direction perpendicular to the first portion 900. The fourth portion 940 extends from the third portion 920 and penetrates the stationary unit. The fifth portion 910 extends from the fourth portion 940 and provided in a straight line on the first surface of the stationary unit, in parallel to the first portion 900. The sixth portion 950 extends from the fifth portion 910 and penetrates the stationary unit. The seventh portion 960 extends from the sixth portion 950 and extends along the second surface of the stationary unit in a direction perpendicular to the fifth portion 910. The eighth portion 970 extends from the seventh portion 960 and penetrates the stationary unit. Here, the eighth portion 970 corresponds to the above-mentioned pattern-connecting portions.

Preferably, the stationary unit is a generally flat plate, but need not be limited thereto. Furthermore, if the stationary unit is formed from a material capable of shielding a magnetic field, the second portion 930, the fourth portion 940, the sixth portion 950, and the eighth portion 970, extending in a thickness direction of (e.g., through) the stationary unit, and the third portion 920 and the seventh portion 960, extending along the second (i.e. "back") surface of the stationary unit, do not have any influence on changes in the magnetic or electric fields affecting the electric wires of a moveable gauge. Accordingly, accuracy in load measurement can be further improved because those portions producing errors are effectively eliminated.

The wiring patterns of the moveable gauge 850 are substantially the same as those of the stationary gauge 800, and a description thereof is therefore omitted. The moving unit is also substantially the same as the stationary unit, and a description thereof is therefore also omitted.

As illustrated in FIG. 16, electronic elements 700, such as a condenser, a resistor, an inductor, and a diode may be included in a third portion 920 and a seventh portion 960, provided on the second surface of each of a stationary unit and a moving unit, of the stationary gauge 800 and the moveable gauge 850, respectively. In this specification, the term 'electronic elements' refers to components which may have an effect on current and voltage of circuits and thus may include condensers, resistors, inductors, and diodes, for example. The electronic elements 700 can be provided to compensate for portions producing errors, other than the first portion 900 and the fifth portion 930, of the electric wire patterns.

While the present invention has been described with reference to particular illustrative embodiments, it is not to be restricted by the embodiments but only by the appended claims. It is to be appreciated that those skilled in the art can change or modify the embodiments without departing from the scope or spirit of the present invention.

INDUSTRIAL APPLICABILITY

According to the subject load measuring systems, load measuring transducers and load measuring methods of the present invention, an applied load can be measured either in real time by inducing elastic deformation in a structure due to an applied load and by continuously measuring an accurate induced voltage corresponding to that elastic deformation. Such measurements can be performed without any distortion using simple components, independent of a motion path, by measuring the induced voltages, in some cases after a predetermined period of time lapses. In this manner, the following advantages can be obtained.

First, in accordance with the invention elements of the prior art that disturb or distort behavior of the structure, which are not uniform and which cannot be correctly predicted, are essentially eliminated, resulting in higher accuracies.

Second, since simplified structures and components are employed, another advantage is that low production costs can be achieved.

Third, there is a further advantage in that the present invention can be variously applied within a wide range of light load to heavy load (above several tons) applications, according to the capacities of the precise structure and gauge design.

Fourth, because a transducer that operates relatively well under severe conditions or environments, in which external impact is produced, for example, can be implemented according to the structures of the present invention, there is a still further advantage in that the present invention can be used as a reliable load measuring system in a variety of outdoor industrial fields.

Fifth, because transducers in accordance with the present invention can be embodied in various sizes, including very small sizes, there is a still further advantage in that the present invention can be widely applied to various fields.

Sixth, errors resulting from the eccentricity of applied load are basically solved. Accordingly, there is an advantage in that accuracy in load measurement can be increased.

Seventh, according to the present invention, portions producing errors are structurally removed from electric wire patterns for producing induced voltage. Accordingly, there are advantages in that a separate error correction process can be omitted and measurement accuracy can be increased.

What is claimed is:

1. A load measuring transducer for measuring load applied to a structure, the structure including a deformation-producing portion configured to exhibit elastic deformation when the load is applied to the structure, the load measuring transducer comprising:

a stationary gauge having electric wire patterns with a predetermined pitch formed thereon, the wire pattern repeating a predetermined number of times, and configured and adapted to receive application of AC electricity;

a stationary unit having the stationary gauge formed therein;

first and second moveable gauges configured to move in a longitudinal direction with respect to the stationary gauge without coming into contact with the stationary gauge, in response to elastic deformation produced in the deformation-producing portion, the first and second moveable gauges each having electric wire patterns formed thereon with the same pitch as the stationary gauge, the wire pattern repeating a predetermined number of times; and a moveable unit having the first and second moveable gauges formed therein, wherein each of the electric wire patterns of the stationary gauge, the first moveable gauge, and the second moveable gauge comprises a first portion extending in a straight line, a second portion extending in a direction perpendicular to the first portion, a third portion extending in parallel to the first portion in a direction perpendicular to the second portion, and a pattern-connecting portion extending in a direction perpendicular to the third portion, wherein the first moveable gauge is formed in the moveable unit such that the first portion of the electric wire patterns of the first moveable gauge overlaps with the first portion of the electric wire patterns of the stationary gauge, and wherein the second moveable gauge is formed in the moveable unit such that the first portion of the electric wire patterns of the second moveable gauge is displaced by ¼ pitch from the first portion of the electric wire patterns of the stationary gauge.

2. A load measuring system for measuring load applied to a structure including a deformation-producing portion configured to exhibit elastic deformation when the load is applied to the structure, the load measuring system comprising:

a load measuring transducer, comprising a stationary gauge having electric wire patterns with a predetermined pitch formed thereon, the wire pattern repeating a predetermined number of times, and configures and adapted to receive application of AC electricity, a stationary unit having the stationary gauge formed therein, first and second moveable gauges configured to move in a longitudinal direction of the stationary gauge without coming into contact with the stationary gauge, in response to elastic deformation produced in the deformation-producing portion, the first and second moveable gauges each having electric wire patterns formed thereon with the same pitch as the stationary gauge, the wire pattern repeating a predetermined number of times, and a moveable unit having the first and second moveable gauges formed therein; and a calculation unit calculating a magnitude of the applied load based on a ratio of induced voltages output from the first and second moveable gauges of the transducer, wherein each of the electric wire patterns of the stationary gauge, the first moveable gauge, and the second moveable gauge comprises a first portion extending in a straight line, a second portion extending in a direction perpendicular to the first portion, a third portion extending in parallel to the first portion in a direction perpendicular to the second portion, and a pattern-connecting portion extending in a direction perpendicular to the third portion, wherein the first moveable gauge is formed in the moveable unit such that the first portion of the electric wire patterns of the first moveable gauge overlaps with the first portion of the electric wire patterns of the stationary gauge, and wherein the second moveable gauge is formed in the moveable unit such that the first portion of the electric wire patterns of the second moveable gauge is displaced by ¼ pitch from the first portion of the electric wire patterns of the stationary gauge.

3. The load measuring transducer as claimed in claim 1, wherein the applied load is measured based on a ratio of a voltage measured from the first moveable gauge and an induced voltage measured from the second moveable gauge.

4. The load measuring transducer as claimed in claim 1, wherein the first moveable gauge and the second moveable gauge are formed in different moveable units.

5. The load measuring transducer as claimed in claim 1, wherein the moveable gauge is movable within a range of ¼ of a pattern pitch of the stationary gauge.

* * * * *